(12) United States Patent
Kinoshita

(10) Patent No.: US 10,751,708 B2
(45) Date of Patent: Aug. 25, 2020

(54) HONEYCOMB STRUCTURE

(71) Applicant: NGK INSULATORS, LTD., Nagoya (JP)

(72) Inventor: Takashi Kinoshita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 177 days.

(21) Appl. No.: 15/926,182

(22) Filed: Mar. 20, 2018

(65) Prior Publication Data

US 2018/0280963 A1    Oct. 4, 2018

(30) Foreign Application Priority Data

Mar. 30, 2017    (JP) .................. 2017-068318

(51) Int. Cl.
| | |
|---|---|
| *B01D 46/24* | (2006.01) |
| *B01J 35/04* | (2006.01) |
| *C04B 38/00* | (2006.01) |
| *B01J 37/02* | (2006.01) |
| *C04B 35/195* | (2006.01) |
| *C04B 35/638* | (2006.01) |

(Continued)

(52) U.S. Cl.
CPC ............ *B01J 35/04* (2013.01); *B01D 46/247* (2013.01); *B01D 46/2429* (2013.01); *B01D 46/2459* (2013.01); *B01D 46/2474* (2013.01); *B01J 35/023* (2013.01); *B01J 37/0215* (2013.01); *C04B 35/195* (2013.01); *C04B 35/638* (2013.01); *C04B 38/0006* (2013.01); *C04B 38/0009* (2013.01); *F01N 3/2828* (2013.01); *B01D 2046/2433* (2013.01); *B01D 2046/2481* (2013.01); *B01D 2046/2492* (2013.01); *C04B 2235/606* (2013.01); *C04B 2235/6021* (2013.01); *C04B 2235/6567* (2013.01); *F01N 2330/34* (2013.01); *F01N 2330/38* (2013.01)

(58) Field of Classification Search
None
See application file for complete search history.

(56) References Cited

U.S. PATENT DOCUMENTS

| | | | | |
|---|---|---|---|---|
| 4,740,408 | A | * | 4/1988 | Mochida ............... B01D 46/10 422/179 |
| 6,224,703 | B1 | | 5/2001 | Yamasaki et al. |

FOREIGN PATENT DOCUMENTS

| | | |
|---|---|---|
| EP | 1 384 507 B1 | 7/2008 |
| EP | 2 070 579 B1 | 2/2017 |
| JP | S62-266298 A1 | 11/1987 |

OTHER PUBLICATIONS

Hydraulic Diameter, Neurtium, Apr. 1, 2012 (Year: 2012).*
German Office Action (with English translation), German Application No. 10 2018 002 330.4, dated Apr. 29, 2020.

* cited by examiner

*Primary Examiner* — Humera N. Sheikh
*Assistant Examiner* — Mary I Omori
(74) *Attorney, Agent, or Firm* — Burr & Brown, PLLC

(57) ABSTRACT

A honeycomb structure includes a pillar-shaped honeycomb structure body having porous partition walls, wherein the partition walls have projecting portions, the sectional area SA and the sectional area SB satisfy a relation of Formula (1) mentioned below, the number NA of the projecting portions and the number NB of the projecting portions satisfy a relation of Formula (2) mentioned below, Formula (1): ⅓<(the sectional area SA/the sectional area SB)<3, and Formula (2): 0≤(the number NB of the projecting portions/the number NA of the projecting portions)<1.

5 Claims, 3 Drawing Sheets

(51) Int. Cl.
*B01J 35/02* (2006.01)
*F01N 3/28* (2006.01)

HONEYCOMB STRUCTURE

The present application is an application based on JP-2017-068318 filed on Mar. 30, 2017 with Japan Patent Office, the entire contents of which are incorporated herein by reference.

BACKGROUND OF THE INVENTION

Field of the Invention

The present invention relates to a honeycomb structure, and more particularly, it relates to a honeycomb structure which is especially suitably utilizable as a catalyst carrier onto which an exhaust gas purifying catalyst is to be loaded.

Description of the Related Art

In recent years, awareness toward environmental problems has increased in the whole world. Consequently, in fields of technologies in which fuel is burnt to generate power, various technologies have been developed to remove toxic components such as nitrogen oxides from exhaust gases generated during the burning of the fuel. For example, there have been developed various technologies of removing toxic components such as nitrogen oxides from exhaust gases to be emitted from car engines. When the toxic components in the exhaust gases are removed, it is general to cause a chemical reaction in such a toxic component by use of a catalyst, thereby changing the component to another comparatively harmless component. Furthermore, as a catalyst carrier onto which an exhaust gas purifying catalyst is to be loaded, a honeycomb structure is used.

Heretofore, as this honeycomb structure, there has been suggested a honeycomb structure including a honeycomb structure body having porous partition walls which define a plurality of cells to form through channels for a fluid. As the honeycomb structure, for the purpose of increasing a geometric surface area of partition walls, there has been suggested a honeycomb structure in which fins projecting inwardly from the partition walls are disposed (e.g., see Patent Document 1).

[Patent Document 1] JP-A-S62-266298

SUMMARY OF THE INVENTION

In such a honeycomb structure as disclosed in Patent Document 1, a geometric surface area of partition walls can be increased by fins disposed on the partition walls. However, in such a honeycomb structure as in Patent Document 1, when the honeycomb structure is used as a catalyst carrier, there is the problem that a catalyst is not effectively used. In particular, the catalyst loaded onto a circumferential portion of the honeycomb structure described in Patent Document 1 has not sufficiently been used yet.

The present invention has been developed in view of such problems of conventional technologies. According to the present invention, there is provided a honeycomb structure which is especially suitably utilizable as a catalyst carrier onto which an exhaust gas purifying catalyst is to be loaded. In particular, there is provided the honeycomb structure in which improvement of a purification performance is expected while inhibiting rise of pressure loss.

According to the present invention, there is provided a honeycomb structure as follows.

According to a first aspect of the present invention, a honeycomb structure is provided including:

a pillar-shaped honeycomb structure body having porous partition walls arranged to define a plurality of cells extending from a first end face to a second end face to form through channels for a fluid, and a circumferential wall disposed to surround the partition walls, wherein the partition walls have projecting portions projecting to extend into the cells and arranged continuously in an extending direction of the cells, the honeycomb structure body has a region A and a region B in a cross section of the honeycomb structure body which is perpendicular to an extending direction of the cells, the region A is a region including the cells in which the projecting portions projecting into the cells are disposed and in which the number of the projecting portions to project into the cells is larger than an average number of the projecting portions to all the cells, the region B is a region which surrounds the region A in the cross section, a sectional area of the region A is defined as a sectional area $SA$, a sectional area of the region B is defined as a sectional area $SB$, and the sectional area $SA$ and the sectional area $SB$ satisfy a relation of Formula (1) mentioned below, an average number of the projecting portions in a cell to be included in the region A is defined as a number $NA$ of the projecting portions, an average number of the projecting portions in a cell to be included in the region B is defined as a number $NB$ of the projecting portions, and the number $NA$ of the projecting portions and the number $NB$ of the projecting portions satisfy a relation of Formula (2) mentioned below, and when a region C which does not correspond to any one of the region A and the region B is present, a ratio of a sectional area of the region C to a sectional area of the honeycomb structure body is 5% or less, $$\tfrac{1}{3} < (\text{the sectional area } SA/\text{the sectional area } SB) < 3, \text{ and} \qquad \text{Formula (1):}$$

$$0 \leq (\text{the number } NB \text{ of the projecting portions}/\text{the number } NA \text{ of the projecting portions}) < 1. \qquad \text{Formula (2):}$$

According to a second aspect of the present invention, the honeycomb structure according to the above first aspect is provided, wherein in the cells of 25% or more of the plurality of cells, the projecting portions project into the cells, a tip curvature radius R of an apex of each of the projecting portions is from 0.01 to 0.1 mm, side surfaces of the projecting portions are inclined to the surfaces of the partition walls at an inclination angle of 40 to 70°, and a hydraulic diameter A of the cell and a height H of the projecting portion satisfy a relation of $0.04 \leq H/A \leq 0.4$.

According to a third aspect of the present invention, the honeycomb structure according to the above first or second aspects is provided, wherein in the partition walls arranged to define the cells, the number of the projecting portions to be disposed per side constituting a peripheral edge of the cell is 3 or less.

According to a fourth aspect of the present invention, the honeycomb structure according to any one of the above first to third aspects is provided, wherein the projecting portions are disposed in a central portion of the honeycomb structure body excluding a circumferential portion of a region of 5 mm from a circumference of the honeycomb structure body.

According to a fifth aspect of the present invention, the honeycomb structure according to any one of the above first to third aspects is provided, wherein the projecting portions are disposed in the whole region of the honeycomb structure body.

According to a sixth aspect of the present invention, the honeycomb structure according to any one of the above first to fifth aspects is provided, wherein the projecting portions are disposed in an intersecting region where the partition walls of two sides constituting a peripheral edge of the cell intersect.

A honeycomb structure of the present invention has projecting portions arranged to project into cells, and hence, a geometric surface area of partition walls can be increased by the projecting portions. In particular, a region A where the number of the projecting portions per cell is large is disposed at a position with which a lot of exhaust gas comes in contact, so that the exhaust gas can uniformly flow over the whole end face of the honeycomb structure. That is, all the cells have the same number of the projecting portions per cell, a flow rate of the exhaust gas becomes uneven. For example, the flow rate of the exhaust gas in a central portion of the honeycomb structure increases, and the flow rate of the exhaust gas in the vicinity of a circumferential portion decreases. In this case, the catalyst loaded onto the circumferential portion of the honeycomb structure is not effectively utilized concerning purification of the exhaust gas. According to the honeycomb structure of the present invention, such problems are solved, and the purification of the exhaust gas by the catalyst can suitably be performed. Furthermore, when the projecting portions are disposed, there is the tendency that pressure loss increases, but in the honeycomb structure of the present invention, rise of the pressure loss is inhibited.

DESCRIPTION OF THE PREFERRED EMBODIMENTS

Hereinafter, description will specifically be made as to embodiments of the present invention with reference to the drawings. The present invention is not limited to the following embodiments. It should be understood that the following embodiments to which changes, improvements and the like are suitably added on the basis of ordinary knowledge of a person skilled in the art without departing from the gist of the present invention also fall in the scope of the present invention.

Figure 1:
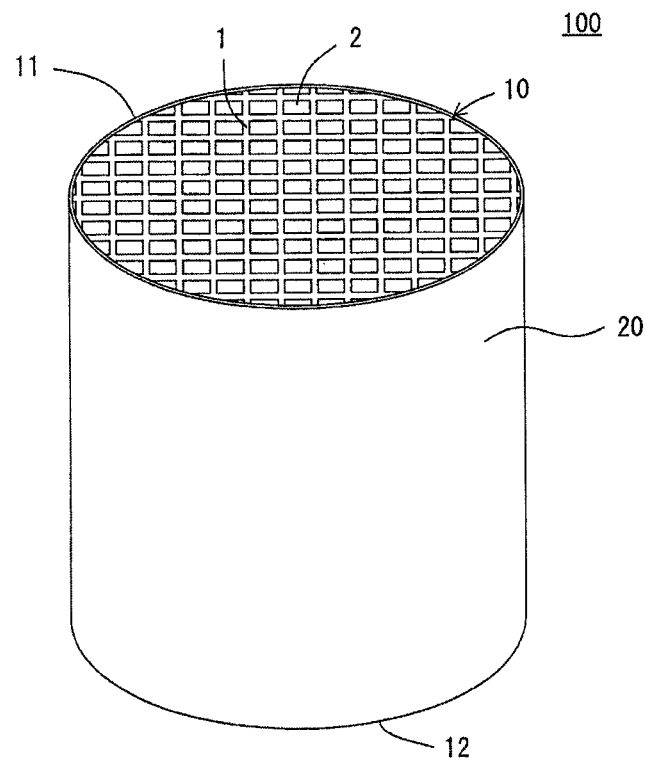
FIG. 1 is a perspective view schematically showing an embodiment of a honeycomb structure of the present invention.
Figure 2:
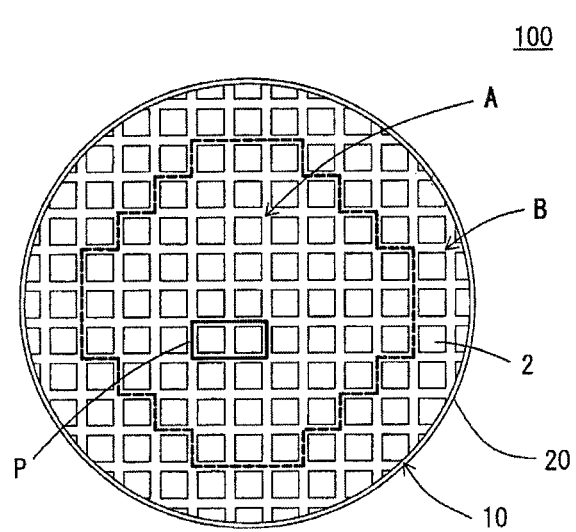
FIG. 2 is a plan view schematically showing an inflow end face of the embodiment of the honeycomb structure of the present invention.
Figure 3:
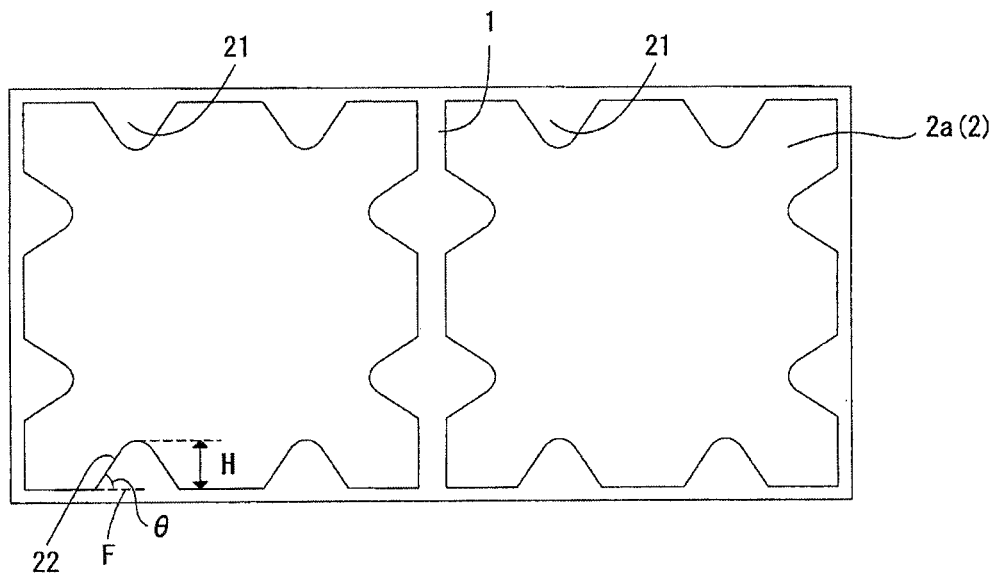
FIG. 3 is a plan view schematically showing an enlarged part (a region P) of the inflow end face shown in FIG. 2.

(1) Honeycomb Structure:

An embodiment of a honeycomb structure of the present invention is a honeycomb structure 100 shown in FIG. 1 to FIG. 3. The honeycomb structure 100 includes a pillar-shaped honeycomb structure body 10. The honeycomb structure body 10 has porous partition walls 1 arranged to define a plurality of cells 2 extending from a first end face 11 to a second end face 12 to form through channels for a fluid, and a circumferential wall 20 disposed to surround the partition walls 1. The partition walls 1 have projecting portions 21 projecting to extend into the cells 2 and arranged continuously in an extending direction of the cells 2. Here, the honeycomb structure body 10 has a region A and a region B in a cross section of the honeycomb structure body 10 which is perpendicular to an extending direction of the cells 2. The region A and the region B are regions having the following constitutions in the cross section perpendicular to the extending direction of the cells 2.

The region A is a region including the cells 2 in which the projecting portions 21 projecting into the cells 2 are disposed and in which the number of the projecting portions 21 to project into the cells 2 is larger than an average number of the projecting portions 21 to all the cells 2. Here, "the average number of the projecting portions 21 to all the cells 2" means a value obtained by dividing the number of all the projecting portions 21 to be disposed on the partition walls 1 constituting the honeycomb structure body 10 by the number of all the cells 2 that are present in the honeycomb structure body 10. Hereinafter, "the average number of the projecting portions 21 to all the cells 2" will occasionally be referred to as "the overall average number of the projecting portions 21". Therefore, it can be considered that the region A is the region constituted of the cells 2 in which the number of the projecting portions 21 to project into each cell 2 is larger than "the overall average number of the projecting portions 21". It is to be noted that when the cells 2 in which the number of the projecting portions 21 to project into the cell 2 is not more than "the overall average number of the projecting portions 21" are present in a range constituting the region A, such cells 2 are not included in the cells 2 constituting the region A, and a range where the cells 2 are present is defined as an after-mentioned region C. That is, in the range constituting the region A, island-shaped regions C constituted of the cells 2 which do not satisfy conditions of the region A may be scattered.

The region B is a region which surrounds the region A in the cross section of the honeycomb structure body 10 which is perpendicular to the extending direction of the cells 2. That is, in the above cross section, the cells 2 which do not satisfy the conditions of the region A are present on an outer side of the region A, and the region constituted of such cells 2 is the region B. It is to be noted that there are not any special restrictions on the number of the projecting portions 21 per cell 2 in the cells 2 constituting the region B. For example, the cells 2 constituting the region B may be the cells 2 defined by the partition walls 1 on which the projecting portions 21 are not disposed, or may be the cells 2 defined by the partition walls 1 on which the projecting portions 21 are disposed.

Furthermore, the honeycomb structure body 10 may have the region C (not shown) which does not correspond to any one of the region A and the region B in the cross section of the honeycomb structure body 10 which is perpendicular to the extending direction of the cells 2. That is, the region C which does not correspond to the region A may be present on a side inner than the region B. An example of the region C can include the island-shaped region constituted of the cells 2 which do not satisfy the conditions of the region A in the range constituting the region A as described above. However, in the honeycomb structure 100 of the present embodiment, a ratio of a sectional area of the region C to a sectional area of the honeycomb structure body 10 is 5% or less.

Here, a sectional area of the region A is defined as a sectional area SA. Furthermore, a sectional area of the region B is defined as a sectional area SB. At this time, in the honeycomb structure 100, the sectional area SA and the sectional area SB satisfy a relation of Formula (1) mentioned below. Additionally, an average number of the projecting portions 21 in a cell to be included in the region A is defined as a number NA of the projecting portions, and an average number of the projecting portions 21 in a cell to be included in the region B is defined as a number NB of the projecting portions. At this time, in the honeycomb structure 100, the number NA of the projecting portions and the number NB of the projecting portions satisfy a relation of Formula (2) mentioned below.

$$\frac{1}{3} < \text{(the sectional area } SA/\text{the sectional area } SB) < 3, \text{ and} \quad \text{Formula (1):}$$

$$0 \leq \text{(the number } NB \text{ of the projecting portions/the number } NA \text{ of the projecting portions)} < 1. \quad \text{Formula (2):}$$

The honeycomb structure 100 has the projecting portions 21 arranged to project into the cells 2. Consequently, when a catalyst is loaded onto the honeycomb structure 100, by the increase amount of area of the projecting portions 21 a catalyst loading area of the honeycomb structure 100 in which the projecting portions 21 are disposed is larger than that of a honeycomb structure in which the projecting portions 21 are not disposed. As a result, contact properties of the catalyst with an exhaust gas improve, and a purification performance of the exhaust gas improves. Furthermore, the honeycomb structure has the region A and the region B, so that further improvement of the purification performance of the exhaust gas can be expected. Additionally, the honeycomb structure 100 satisfies the above conditions, thereby inhibiting rise of pressure loss.

It is to be noted that hereinafter, among the cells 2, the cells 2 into which the projecting portions 21 project will occasionally be referred to as "specific cells".

It is to be noted that there are not any special restrictions on a position of the region A, and the position can suitably be set in accordance with arrangement conditions when the honeycomb structure is used. That is, unevenness of a flow rate of the exhaust gas varies in accordance with the arrangement conditions when the honeycomb structure is used, or the like, and hence, the position can suitably be set in accordance with the conditions during the use. Specifically, as shown in FIG. 2, in the end face of the honeycomb structure 100, the region A may be present in a central portion, or the region A may be deviated close toward a circumferential portion.

"The sectional area SA" that is the sectional area of the region A is defined as an area of a region on a side including the cells 2 satisfying the conditions of the region A via a boundary line K of a boundary, when the boundary line K is drawn between the region A and the regions B and C in the cross section perpendicular to the extending direction of the cells 2. The boundary line K is drawn to divide, into two equal parts, a thickness of the partition wall 1 on which the boundary line K is drawn. Therefore, the sectional area of the region A includes an area of the cells 2 which satisfy the conditions of the region A and an area of the partition walls 1 which define the cells 2 (provided that an area of each partition wall 1 is an area of a half of the thickness of the partition wall 1).

"The sectional area SB" that is the sectional area of the region B is defined as an area of a region on a side including the cells 2 constituting the region B via a boundary line K of a boundary, when the boundary line K is drawn between the region B and the region A in the cross section perpendicular to the extending direction of the cells 2. The boundary line K is drawn to divide, into two equal parts, a thickness of the partition wall 1 on which the boundary line K is drawn. Therefore, the sectional area of the region B includes an area of the cells 2 which constitute the region B and an area of the partition walls 1 which define the cells 2 (provided that an area of each partition wall 1 is an area of a half of the thickness of the partition wall 1). It is to be noted that the region B includes an area up to a circumferential edge of the honeycomb structure 100. For example, when the region C is not present in the range constituting the region A, "the sectional area SB" of the region B is a value obtained by subtracting the sectional area SA from an area on an inner side of the circumferential edge of the honeycomb structure 100 (the area includes an area of the cells 2 and an area of the partition walls 1).

"A sectional area SC" that is a sectional area of the region C is defined as an area of a region on a side including the cells 2 constituting the region C via a boundary line K of a boundary, when the boundary line K is drawn between the region C and the region A in the cross section perpendicular to the extending direction of the cells 2. It is to be noted that the boundary line K is drawn on the same conditions as in conditions to draw the line in obtaining "the sectional area SA". A ratio of "the sectional area SC" that is the sectional area of the region C to the sectional area of the honeycomb structure body is 5% or less. When the ratio of "the sectional area SC" that is the sectional area of the region C is in excess of 5%, a large number of the cells 2 which do not satisfy the conditions of the region A might be present, and an effect of achieving the improvement of the purification performance does not sufficiently develop.

In the honeycomb structure of the present invention, as described above, the sectional area SA and the sectional area SB satisfy the relation of Formula (1). A lower limit of Formula (1) is preferably 0.4 and further preferably 0.45. Furthermore, an upper limit of Formula (1) is preferably 0.6 and further preferably 0.55. In this way, the sectional area SA and the sectional area SB satisfy the relation of Formula (1), so that the improvement of the purification performance is achievable while inhibiting the rise of the pressure loss.

In the honeycomb structure of the present invention, as described above, the number NA of the projecting portions and the number NB of the projecting portions satisfy the relation of Formula (2). A lower limit of Formula (2) is preferably 0.1 and further preferably 0.2. Furthermore, an upper limit of Formula (2) is preferably 0.9 and further preferably 0.8. In this way, the number NA of the projecting portions and the number NB of the projecting portions satisfy the relation of Formula (2), thereby increasing the flow rate of the exhaust gas flowing through the circumferential portion of the honeycomb structure. Therefore, the exhaust gas can uniformly flow over the whole end face of the honeycomb structure. As a result, the improvement of the purification performance is achievable.

The number NA of the projecting portions is "the average number of the projecting portions in a cell to be included in the region A" as described above. This "average number of the projecting portions in the cell to be included in the region A" is defined as a value obtained by dividing a total number of the projecting portions included in the region A by a total number of the cells included in the region A (a value calculated by a numerical formula: the total number of the projecting portions to be included in the region A/the total number of the cells to be included in the region A). Furthermore, the number NB of the projecting portions is "the average number of the projecting portions in a cell to be included in the region B" as described above. This "average number of the projecting portions in the cell to be included in the region B" is defined as a value obtained by dividing a total number of the projecting portions to be included in the region B by a total number of the cells to be included in the region B (a value calculated by a numerical formula: the total number of the projecting portions to be included in the region B/the total number of the cells to be included in the region B).

(1-1) Projecting Portion:

In the honeycomb structure 100, it is preferable that in the cells 2 of 25% or more of the plurality of cells 2, the projecting portions 21 project into the cells 2. That is, it is preferable that the honeycomb structure of the present invention includes 25% or more of the specific cells in all the cells. In the honeycomb structure 100, a ratio of the specific cells in all the cells (a value calculated by a numerical formula: (the number of the specific cells/a total number of the cells)×100) is preferably from 50 to 100% and further preferably from 60 to 80%. When the ratio of the specific cells in all the cells is in the above range, more suitable exhaust gas purification performance is exerted. When the ratio of the specific cells in all the cells is less than the above lower limit, there is the fear of occurrence of the disadvantage that the purification performance deteriorates. When the ratio is in excess of the upper limit, there is the fear of occurrence of the disadvantage that the pressure loss increases.

Figure 6:
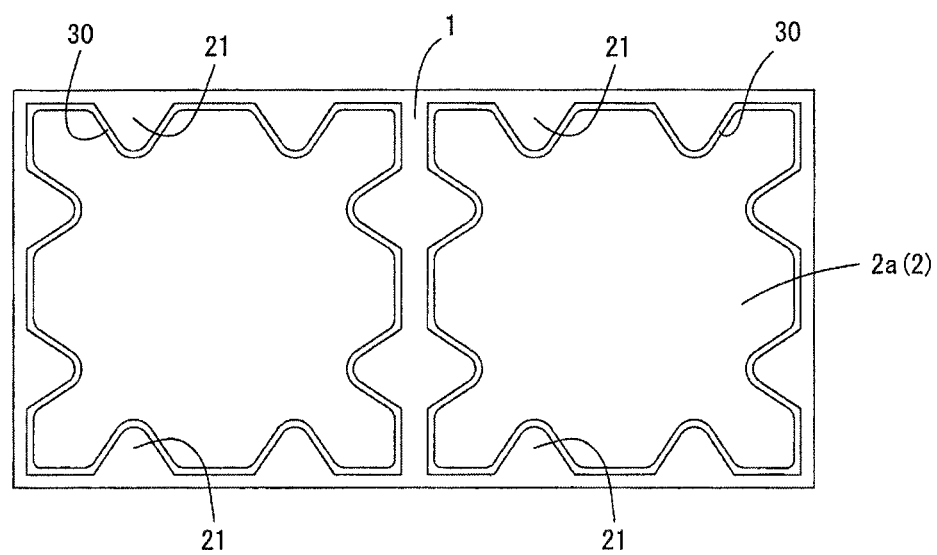
FIG. 6 is an enlarged plan view schematically showing a state where a catalyst is loaded in the embodiment of the honeycomb structure of the present invention.

Furthermore, it is preferable that the honeycomb structure 100 satisfies the following (1) to (3). (1) A tip curvature radius R of an apex of each of the projecting portions 21 is from 0.01 to 0.1 mm. (2) Side surfaces 22 of the projecting portions 21 are inclined to the surfaces (i.e., a bottom side F (see FIG. 3) of the partition walls 1 at an inclination angle θ of 40 to 70°. (3) A hydraulic diameter A of the cell 2 and a height H of the projecting portion 21 satisfy a relation of $0.04 \leq H/A \leq 0.4$. Thus, these conditions are satisfied, so that a catalyst 30 can uniformly be loaded onto the surfaces of the partition walls 1 as shown in FIG. 6. As a result, the improvement of the purification performance of the honeycomb structure 100 onto which the catalyst is loaded is achievable. FIG. 6 is an enlarged plan view schematically showing a state where the catalyst is loaded in the embodiment of the honeycomb structure of the present invention.

In the projecting portion, it is preferable that the tip curvature radius R of the apex of the projecting portion is from 0.01 to 0.1 mm as described above. Furthermore, the tip curvature radius R is further preferably from 0.01 to 0.08 mm and especially preferably from 0.01 to 0.07 mm. When the tip curvature radius R is in the above range, the catalyst is also loaded onto the tips of the apexes of the projecting portions, and the exhaust gas is effectively purified by the catalyst loaded onto the tips of the apexes. When the tip curvature radius R is less than the lower limit, there is the fear that the catalyst is hard to be loaded onto the tips of the apexes of the projecting portions. Furthermore, when the tip curvature radius R is in excess of the upper limit and when heights of the projecting portions are adjusted to be the same, there is the fear of occurrence of the disadvantages that a weight of the honeycomb structure 100 increases and that the purification performance deteriorates.

Figure 5:
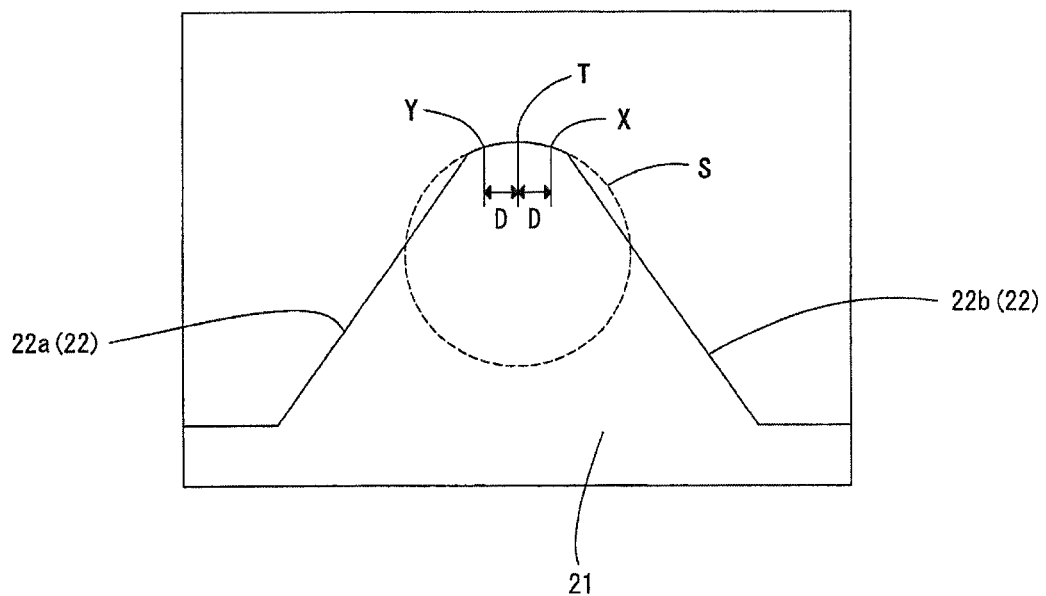
FIG. 5 is a plan view schematically showing an enlarged projecting portion in the embodiment of the honeycomb structure of the present invention.

In the present description, "the tip curvature radius R" is a value obtainable as follows. Initially, in the cross section perpendicular to the cell extending direction, points on side surfaces (one side surface 22a and the other side surface 22b) which are away as much as a distance D (5 μm) in a width direction from an apex T of the projecting portion (the highest point of the projecting portion) are defined as a first measurement point X and a second measurement point Y (see FIG. 5). Then, when a circle S is drawn to pass through these three points (the apex T, the first measurement point X and the second measurement point Y), a radius of the drawn circle S is defined as the above "tip curvature radius R".

Specifically, the height of the projecting portion 21 can be from 0.05 to 0.3 mm. The heights of the respective projecting portions may be the same or different. It is to be noted that the height of the projecting portion 21 is referred to the shortest distance from the apex T of the projecting portion (the highest point of the projecting portion) to the bottom side F (see FIG. 3) in the cross section perpendicular to the cell extending direction.

It is preferable that the side surfaces of the projecting portions are inclined to the surfaces of the partition walls at the inclination angle θ of 40 to 70° as described above. It is further preferable that the inclination angle θ is from 45 to 65°. When the inclination angle θ is in the above range, the catalyst is hard to thickly accumulate in roots of the projecting portions during coating with the catalyst (during the catalyst coating), a surface area coated with the catalyst can increase (after the catalyst coating), and the purification performance of the exhaust gas improves. When the inclination angle θ is less than the above lower limit and when the heights of the projecting portions are adjusted to be the same while changing their angles, a volume of the projecting portions increases. In consequence, a heat capacity of the honeycomb structure increases, much time is therefore required until the catalyst reaches its activation temperature, and there is the fear that the purification performance of the exhaust gas deteriorates. When the inclination angle θ is in excess of the above upper limit, there is the fear that a lot of catalyst accumulates in the roots of the projecting portions during the catalyst coating. In other words, there is the tendency that a thick layer of the catalyst (a catalyst layer) is formed in the roots of the projecting portions. Therefore, there is the fear that the catalyst of the lower layer portion of this catalyst layer (the portion closer to the partition wall) is not effectively used (the catalyst does not contribute to the purification of the exhaust gas). Here, in the cross section perpendicular to the cell extending direction, the inclination angle θ is defined as an angle formed by a tangent line of each side surface of the projecting portion at a position of ½ of the height of the projecting portion and an extension line of the bottom side F (see FIG. 3). It is to be noted that the inclination angle θ is an acute angle in the angles formed by the surface of the partition wall and the side surface of the projecting portion.

In the relation between the height H of the projecting portion and the hydraulic diameter A of the cell, it is preferable to satisfy $0.04 \leq H/A \leq 0.4$ as described above. This relational expression is further preferably $0.045 \leq H/A \leq 0.4$ and especially preferably $0.05 \leq H/A \leq 0.035$. When the height H of the projecting portion and the hydraulic diameter A of the cell satisfy the above relation, it is possible to inhibit the increase of the pressure loss. When a ratio of the relation is less than the lower limit, a bag emission excessively increases, and a sufficient purification performance might not be exerted. Furthermore, when the ratio is in excess of the upper limit, there is the fear that the pressure loss excessively increases.

It is to be noted that the hydraulic diameter of the cell is a value calculated by 4×(a sectional area)/(a peripheral length) on the basis of the sectional area and peripheral length of each cell. The sectional area of the cell indicates an area of a shape (a sectional shape) of the cell which appears in a cross section of a plugged honeycomb structure which is vertical to a central axis direction, and the peripheral length of the cell indicates a length of a periphery of the sectional shape of the cell (a length of a closed line which surrounds the cross section).

There are not any special restrictions on a forming position of the projecting portion. Specifically, the projecting portion may be disposed to project from the surface of the partition wall, or may be disposed in an intersecting region where the partition walls of two sides constituting the peripheral edge of the cell intersect. Furthermore, the projecting portions may be disposed at both of these positions. Here, in the case of disposing the same number of the projecting portions in a cell, when at least one projecting portion is disposed in the above intersecting region, it is possible to inhibit the increase of the pressure loss more than when the projecting portion is not disposed in the above intersecting region.

Figure 4:
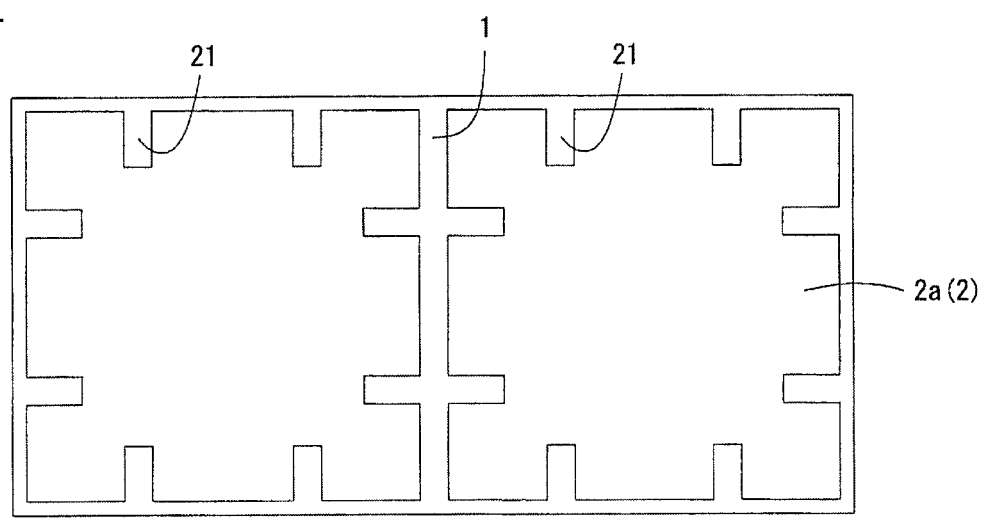
FIG. 4 is a plan view schematically showing an enlarged part of an inflow end face in another embodiment of the honeycomb structure of the present invention.

When the projecting portions are disposed to project from the surfaces of the partition walls, there are not any special restrictions on positions of the projecting portions. For example, the projecting portions can be disposed to equally divide each partition wall. Each of FIG. 3 and FIG. 4 shows an example where two projecting portions 21 are disposed on each partition wall to divide the partition wall into three equal parts.

There are not any special restrictions on the number of the projecting portions 21 to be disposed on each partition wall as long as the above relation between the region A and the region B is satisfied. For example, the number of the projecting portions 21 to be disposed on each partition wall may be 3 or less. That is, in the specific cell, it is preferable that the number of the projecting portions to be disposed per side is 3 or less. In this case, it is possible to prevent the increase of the pressure loss.

There are not any special restrictions on a shape of the projecting portion 21 in the cross section perpendicular to the cell extending direction. Examples of the shape include polygonal shapes such as a triangular shape and a quadrangular shape, a semicircular shape, and a semi-elliptic shape. Among these examples, the triangular shape is preferable. In the triangular shape, there are the advantages that the catalyst is uniformly loaded and that a weight of the projecting portion is smaller than that of a projecting portion having another shape, and the purification performance improves. FIG. 3 shows an example of the projecting portion 21 having a triangular sectional shape. FIG. 4 shows an example of the projecting portion 21 having a quadrangular sectional shape.

It is preferable that the projecting portions are disposed in a central portion of the honeycomb structure body which excludes a circumferential portion of a region of 5 mm from a circumference of the honeycomb structure body. When the projecting portions are disposed in the central portion of the honeycomb structure body in this manner, it is possible to further inhibit the increase of the pressure loss.

It is preferable that the projecting portions 21 are disposed in the whole region of the honeycomb structure body. When the projecting portions are disposed in this manner, the purification performance of the exhaust gas improves. "The whole region of the honeycomb structure body" means the whole region of the honeycomb structure body from the first end face to the second end face. That is, it is meant that the projecting portions are disposed continuously from the first end face to the second end face without being interrupted in their middles.

A thickness of the partition walls 1 is preferably from 40 to 230 μm and further preferably from 40 to 173 μm. When the thickness of the partition walls is less than the lower limit, there is the fear that a mechanical strength runs short. When the thickness is in excess of the upper limit, there is the fear that the pressure loss of the honeycomb structure rises. It is to be noted that the thickness of the partition walls is a thickness of a portion in which the projecting portions are not disposed.

There are not any special restrictions on a material of the partition walls 1. For example, it is preferable that the material contains ceramic as a main component. Specifically, it is preferable that the material is at least one selected from the group consisting of silicon carbide, a silicon-silicon carbide based composite material, cordierite, mullite, alumina, aluminum titanate, silicon nitride, and a silicon carbide-cordierite based composite material.

Specifically, examples of a shape of the cell can include polygonal shapes such as a triangular shape, a quadrangular shape, a pentagonal shape, a hexagonal shape and an octagonal shape, a round shape, an elliptic shape, and any combination of the quadrangular shape with the hexagonal shape, the octagonal shape and the like. It is to be noted that in the present description, "the shape of the cell" means a shape of the cell in which the projecting portions are not disposed. Furthermore, "the polygonal shape of the cell" is a concept of the shape of the cell including a shape which conforms to the polygonal shape.

(1-2) Circumferential Wall:

The circumferential wall 20 is a wall disposed to surround the partition walls 1. The circumferential wall 20 may be formed monolithically with the partition walls 1.

A thickness of the circumferential wall 20 is preferably from 0.1 to 0.6 mm and especially preferably from 0.1 to 0.3 mm. When the thickness of the circumferential wall 20 is less than the lower limit, the mechanical strength might deteriorate. When the thickness is in excess of the upper limit, a large space to store the honeycomb structure occasionally has to be acquired.

A cell density of the honeycomb structure 100 is preferably from 31 to 155 cells/cm$^2$ and especially preferably from 43 to 148 cells/cm$^2$. When the cell density is less than the lower limit, there is the fear that the strength cannot be kept. When the cell density is in excess of the upper limit, there is the fear that the pressure loss of the honeycomb structure rises.

(2) Manufacturing Method of Honeycomb Structure:

The honeycomb structure of the present invention can be manufactured by a method having a honeycomb forming step and a firing step. Hereinafter, description will be made as to each step.

(2-1) Honeycomb Forming Step:

In the present step, a ceramic forming raw material containing a ceramic raw material is formed, to form a honeycomb formed body having partition walls arranged to define a plurality of cells which form through channels for a fluid.

It is preferable that the ceramic raw material contained in the ceramic forming raw material is at least one selected from the group consisting of a cordierite forming raw material, cordierite, silicon carbide, a silicon-silicon carbide based composite material, mullite, and aluminum titanate. It is to be noted that the cordierite forming raw material is a ceramic raw material blended to obtain a chemical composition in which silica falls in a range of 42 to 56 mass %, alumina falls in a range of 30 to 45 mass %, and magnesia falls in a range of 12 to 16 mass %. Then, the cordierite forming raw material is fired to form cordierite.

Furthermore, the ceramic forming raw material can be prepared by mixing the above ceramic raw material with a dispersing medium, an organic binder, an inorganic binder, a pore former, a surfactant and the like. There are not any special restrictions on a composition ratio of each raw material, and it is preferable to set the composition ratio in accordance with a structure, a material and the like of the honeycomb structure to be prepared.

In the case of forming the ceramic forming raw material, the ceramic forming raw material is initially kneaded to obtain a kneaded material, and the obtained kneaded material is formed in a honeycomb shape. An example of a method of kneading the ceramic raw material to form the kneaded material can include a method of using a kneader, a vacuum pugmill or the like. As a method of forming the kneaded material to obtain a honeycomb formed body, for example, a known forming method such as an extrusion molding or an injection molding is usable.

Specifically, a suitable example of the method can include a method of extruding the material by use of a die to form the honeycomb formed body. As a material of the die, cemented carbide which is hard to be worn is preferable.

It is preferable to use the die prepared as follows. That is, there is initially prepared a die (a conventional die) for use in preparing a heretofore known honeycomb structure which does not have any projecting portions. Afterward, there are formed regions which are complementary to the projecting portions (the regions (the projecting portion forming regions) into which the kneaded material enters to form the projecting portions), from slits of this conventional die (gaps to constitute partition walls) toward the outside by discharge processing. At this time, the projecting portion forming regions are formed to satisfy the above relation between the region A and the region B. In this way, a predetermined die can be prepared.

By use of such a die, it is possible to simply prepare the honeycomb formed body having projecting portions which satisfy conditions of the honeycomb structure of the present invention.

There are not any special restrictions on a shape of the honeycomb formed body, and examples of the shape can include a round pillar shape, an elliptic pillar shape, and a polygonal prismatic columnar shape in which each end face has "a square shape, a rectangular shape, a triangular shape, a pentagonal shape, a hexagonal shape, an octagonal shape or the like".

Furthermore, the obtained honeycomb formed body can be dried after the honeycomb formed body is formed as described above. There are not any special restrictions on a drying method. Examples of the drying method can include a hot air drying, a microwave drying, an induction drying, drying under a reduced pressure, a vacuum drying, and a freeze drying. Among these examples, it is preferable to perform one or any combination of the induction drying, the microwave drying and the hot air drying.

(2-2) Firing Step:

Next, the honeycomb formed body is fired to prepare a honeycomb fired body. The firing of the honeycomb formed body (main firing) is performed for the purpose of sintering and densifying the forming raw material constituting a calcinated honeycomb formed body and acquiring a predetermined strength. Firing conditions (a temperature, a time, atmosphere and the like) vary in accordance with a type of forming raw material, and hence, appropriate conditions may be selected in accordance with the type. For example, when the cordierite forming raw material is used, it is preferable that a firing temperature is from 1410 to 1440° C. Furthermore, it is preferable that the firing time is from 4 to 8 hours as a time to keep the highest temperature. As a device which performs calcinating and main firing, an electric furnace, a gas furnace or the like is usable. The honeycomb fired body obtained as described above can be the honeycomb structure of the present invention. It is to be noted that the manufacturing method of the honeycomb structure may further have a circumference coating step as follows.

(2-3) Circumference Coating Step:

In the present step, a circumference of the obtained honeycomb fired body is coated with a circumference coating material to form a circumferential wall. It is to be noted that the circumferential wall may be formed monolithically with the partition walls during the preparation of the honeycomb formed body. The circumferential wall is further formed in the circumference coating step, so that it is possible to prevent the honeycomb structure from being chipped when an external force is applied to the honeycomb structure.

An example of the circumference coating material can include a material obtained by adding additives such as an organic binder, a foamable resin and a dispersing agent to inorganic raw materials such as inorganic fibers, colloidal silica, clay and SiC particles, and adding water to the materials to knead the materials. An example of a coating method with the circumference coating material can include a method of coating "the cut honeycomb fired body" with the material by use of a rubber spatula or the like while rotating the cut honeycomb fired body on a potter's wheel.

EXAMPLES

Hereinafter, the present invention will further specifically be described with reference to examples, but the present invention is not limited to these examples.

Example 1

In Example 1, a forming raw material to prepare a honeycomb structure was initially prepared. Specifically, a binder, a surfactant, a pore former and water were added to a ceramic raw material to obtain a forming raw material. Additionally, as the ceramic raw material, cordierite forming raw materials such as kaolin, talc and alumina were used.

Next, the obtained forming raw material was kneaded with a kneader and then kneaded with a vacuum pugmill, to prepare a kneaded material. Then, the obtained kneaded material was extruded by using a die, to prepare a honeycomb formed body. There was used the die in which regions complementary to projecting portions (regions into which the kneaded material entered to form the projecting portions) were formed. The honeycomb formed body was prepared so that a thickness of partition walls was 0.09 mm and a cell density was 62 cells/cm$^2$ after the honeycomb formed body was fired. A shape of each cell of the honeycomb formed body was quadrangular. The honeycomb formed body had a round pillar shape. A diameter of each end face of the round pillar-shaped honeycomb formed body was 103 mm after the honeycomb formed body was fired. Furthermore, a length of the honeycomb formed body in a cell extending direction was 84 mm after the honeycomb formed body was fired. Additionally, the above die was designed so that the honeycomb structure to be prepared satisfied respective conditions shown in Table 1 and Table 2.

Afterward, the honeycomb formed body was dried, to obtain a honeycomb dried body. During the drying, a microwave drying was initially performed, and then, a hot air drying was performed with hot air at a temperature of 120° C. for 2 hours. Next, both end portions of the honeycomb dried body were cut.

Next, the obtained honeycomb dried body was degreased. The degreasing was performed at 450° C. for 5 hours. Then, the degreased honeycomb dried body was fired, to obtain a honeycomb fired body. The firing was performed at 1425° C. in the atmospheric air for 7 hours. Additionally, a temperature was raised from 1200 to 1425° C. in 5 hours. In this way, the honeycomb structure of Example 1 was prepared.

In the obtained honeycomb structure, such a region A as mentioned below and a region B surrounding the region A were formed (see FIG. 2). The region A was a region constituted of cells in which the number of projecting portions to project into the cells was larger than an average number of the projecting portions to all the cells. In the region A, as shown in FIG. 3, two projecting portions projected from each partition wall of the cell having a quadrangular sectional shape, and eight projecting portions in total were formed in the cell. Furthermore, in the region B, the projecting portions projecting from the partition walls were not disposed on the respective partition walls of the cell having the quadrangular sectional shape. Specifically, the number of the projecting portions in a cell was 0 in the region B. A tip curvature radius R of this honeycomb structure was 0.025 mm. Furthermore, a height H of each projecting portion was 0.14 mm and a hydraulic diameter A of the cell was 0.90 mm. Then, a ratio of H/A (the height H of the projecting portion/the hydraulic diameter A of the cell) was 0.16. Furthermore, in the obtained honeycomb structure, as to all the projecting portions, side surfaces of the projecting portions had an inclination angle of 45° to the surfaces of the partition walls. The obtained honeycomb structure had the same shape as an inverted shape of the shape of the above die.

Additionally, the inclination angle θ of the projecting portion and the height H of the projecting portion were measured by using a profile projector (manufactured by Mitutoyo Corporation) and an image analysis software (manufactured by Mitutoyo Corporation). Furthermore, as to the respective projecting portions, there was confirmed a position at which each projecting portion was disposed. Specifically, an end face of the honeycomb structure was initially photographed with the profile projector to obtain an image, binarization of the image was then performed, and the above measurement and the confirmation were performed by using a measuring function of the image analysis software.

In the prepared honeycomb structure, a ratio of specific cells to all the cells was 50%. Specifically, this ratio was calculated as follows. That is, one honeycomb structure was initially photographed with the profile projector to obtain an image, and then, the number of all the cells and the number of all the specific cells were counted in the honeycomb structure of the image. It is to be noted that each of Table 1 and Table 2 shows a range where the specific cells are present in a column of "a forming region of projecting portions". When "a central region" is described in the column of "the forming region of the projecting portions", it is indicated that the specific cells are present in a central portion corresponding to 50% of an area of a cross section in the cross section of the honeycomb structure which is perpendicular to a cell extending direction. Furthermore, when "the central region and a range excluding a range of 5 mm from a circumference" are described in the column of "the forming region of the projecting portions", it is indicated that the specific cells are present in the range excluding the range of 5 mm from the circumference of the cross section in the cross section of the honeycomb structure which is perpendicular to the cell extending direction.

Furthermore, each of Table 1 and Table 2 shows a position at which the projecting portion is disposed in a column of "a Ruining position of the projecting portion". When "a side portion" is described in the column of "the forming position of the projecting portion", it is meant that the projecting portion is disposed on each partition wall of a side constituting a peripheral edge of the cell. When "a corner portion" is described in the column of "the forming position of the projecting portion", it is meant that the projecting portion is disposed in an intersecting region where partition walls of two sides constituting the peripheral edge of the cell intersect.

Additionally, as to the prepared honeycomb structure, by use of the above profile projector and the image analysis software, a partition wall thickness (mm), a cell density (cells/cm$^2$), a hydraulic diameter (mm) of the cell, a tip curvature radius of the projecting portion and an inclination angle of the projecting portion were measured. Table 1 and Table 2 show the results. It is to be noted that the respective measured values are described above.

Furthermore, as to the prepared honeycomb structure, "a sectional area SA" that was a sectional area of the region A and "a sectional area SB" that was a sectional area of the region B were obtained by using the above profile projector and the above image analysis software. Then, a value was obtained by dividing "the sectional area SA" by "the sectional area SB". Each of Table 1 and Table 2 shows this value in a column of "the sectional area SA/the sectional area SB". Furthermore, there were calculated an average number of the projecting portions in a cell to be included in the region A and an average number of the projecting portions in a cell to be included in the region B. The average number of the projecting portions in the cell to be included in the region A was defined as "a number NA of the projecting portions", the average number of the projecting portions in the cell to be included in the region B was defined as "a number NB of the projecting portions", and a value was obtained by dividing the "the number NA of the projecting portions" by "the number NB of the projecting portions". Each of Table 1 and Table 2 shows this value in a column of "the number NB of the projecting portions/the number NA of the projecting portions".

TABLE 1

|  | Comparative Example 1 | Example 1 | Example 2 | Example 3 | Comparative Example 2 | Example 4 | Comparative Example 3 | Example 5 | Example 6 | Example 7 | Example 8 |
|---|---|---|---|---|---|---|---|---|---|---|---|
| Partition wall thickness (mm) | 0.09 | 0.09 | 0.09 | 0.09 | 0.09 | 0.09 | 0.09 | 0.09 | 0.09 | 0.09 | 0.09 |
| Cell density (cells/cm2) | 62 | 62 | 62 | 62 | 62 | 62 | 62 | 62 | 62 | 62 | 62 |
| Height H of projecting portion (mm) | 0.14 | 0.14 | 0.14 | 0.14 | 0.14 | 0.14 | 0.14 | 0.14 | 0.14 | 0.14 | 0.14 |
| Hydraulic diameter A of cell (mm) | 0.90 | 0.90 | 0.90 | 0.90 | 0.90 | 0.90 | 0.90 | 0.90 | 0.90 | 0.90 | 0.90 |
| No. of projecting portions (projecting portions/cell) Region A | 8 | 8 | 8 | 8 | 8 | 8 | 8 | 8 | 8 | 8 | 8 |
| No. of projecting portions (projecting portions/cell) Region B | 0 | 0 | 0 | 0 | 0 | 4 | 12 | 0 | 0 | 0 | 0 |
| Average No. of projecting portions to all cells | 1.9 | 2.0 | 4.0 | 5.9 | 6.0 | 6.0 | 10.0 | 6.0 | 6.0 | 6.0 | 6.0 |
| Average No. of projecting portions in region A | 8 | 8 | 8 | 8 | 8 | 8 | 8 | 8 | 8 | 8 | 8 |
| Average No. of projecting portions in region B | 0 | 0 | 0 | 0 | 0 | 4 | 12 | 0 | 0 | 0 | 0 |
| Area of region C (%) | 0 | 0 | 0 | 0 | 0 | 0 | 0 | 0 | 0 | 0 | 0 |
| Tip curvature radius R (mm) | 0.025 | 0.025 | 0.025 | 0.025 | 0.025 | 0.025 | 0.025 | 0.1 | 0.15 | 0.025 | 0.025 |
| Inclination angle (°) | 45 | 45 | 45 | 45 | 45 | 45 | 45 | 45 | 45 | 70 | 72 |
| H/A | 0.16 | 0.16 | 0.16 | 0.16 | 0.16 | 0.16 | 0.16 | 0.16 | 0.16 | 0.16 | 0.16 |
| Sectional area SA/sectional area SB | 0.32 | 0.34 | 1.00 | 2.90 | 3.10 | 1.00 | 1.00 | 1.00 | 1.00 | 1.00 | 1.00 |
| Number NB of projecting portions/number NA of projecting portions | 0.00 | 0.00 | 0.00 | 0.00 | 0.00 | 0.50 | 1.50 | 0.00 | 0.00 | 0.00 | 0.00 |
| Ratio of specific cells (%) | 24 | 25 | 50 | 74 | 76 | 50 | 50 | 50 | 50 | 50 | 50 |
| Forming region of projecting portions | Central region | Central region | Central region | Central region | Central region | Central region | Central region | Central region | Central region | Central region | Central region |
| Forming position of projecting portion | Side portion | Side portion | Side portion | Side portion | Side portion | Side portion | Side portion | Side portion | Side portion | Side portion | Side portion |
| Pressure loss (kPa) | 1.10 | 1.11 | 1.20 | 1.50 | 1.51 | 1.40 | 1.60 | 1.50 | 1.50 | 1.10 | 1.05 |
| Judgment of pressure loss | OK | OK | OK | OK | NG | OK | NG | OK | OK | OK | OK |
| Bag emission (g/mile) | 0.020 | 0.018 | 0.015 | 0.010 | 0.009 | 0.013 | 0.018 | 0.018 | 0.019 | 0.018 | 0.019 |
| Judgment of bag emission | NG | OK | OK | OK | OK | OK | OK | OK | OK | OK | OK |
| General judgment | NG | OK | OK | OK | NG | OK | NG | OK | OK | OK | OK |

TABLE 2

|  | Example 9 | Example 10 | Example 11 | Example 12 | Example 13 | Example 14 | Example 15 | Example 16 | Example 17 | Example 18 | Comparative Example 4 | Example 19 |
|---|---|---|---|---|---|---|---|---|---|---|---|---|
| Partition wall thickness (mm) | 0.09 | 0.09 | 0.09 | 0.09 | 0.09 | 0.09 | 0.09 | 0.09 | 0.09 | 0.09 | 0.09 | 0.09 |
| Cell density (cells/cm2) | 62 | 62 | 62 | 62 | 62 | 62 | 62 | 62 | 62 | 62 | 62 | 62 |
| Height H of projecting portion (mm) | 0.03 | 0.05 | 0.19 | 0.2 | 0.14 | 0.14 | 0.14 | 0.14 | 0.14 | 0.14 | 0.14 | 0.14 |
| Hydraulic diameter A of cell (mm) | 1.12 | 1.08 | 0.48 | 0.44 | 0.90 | 0.90 | 0.90 | 0.90 | 1.39 | 0.90 | 0.90 | 0.09 |
| No. of projecting portions (projecting portions/cell) Region A | 8 | 8 | 8 | 8 | 12 | 16 | 8 | 8 | 4 | 8 | 8 | 8 |
| No. of projecting portions (projecting portions/cell) Region B | 0 | 0 | 0 | 0 | 0 | 0 | 0 | 0 | 0 | 0 | 0 | 6 |
| Average No. of projecting portions to all cells | 4.0 | 4.0 | 4.0 | 4.0 | 6.0 | 8.0 | 3.8 | 3.8 | 2.0 | 2.0 | 2.0 | 7.0 |
| Average No. of projecting portions in region A | 8 | 8 | 8 | 8 | 12 | 16 | 8 | 8 | 4 | 8 | 8 | 8 |

TABLE 2-continued

|  | Example 9 | Example 10 | Example 11 | Example 12 | Example 13 | Example 14 | Example 15 | Example 16 | Example 17 | Example 18 | Comparative Example 4 | Example 19 |
|---|---|---|---|---|---|---|---|---|---|---|---|---|
| Average No. of projecting portions in region B | 0 | 0 | 0 | 0 | 0 | 0 | 0 | 0 | 0 | 0 | 0 | 6 |
| Area of region C (%) | 0 | 0 | 0 | 0 | 0 | 0 | 0 | 0 | 0 | 5 | 10 | 0 |
| Tip curvature radius R (mm) | 0.025 | 0.025 | 0.025 | 0.025 | 0.025 | 0.025 | 0.025 | 0.025 | 0.25 | 0.025 | 0.025 | 0.025 |
| Inclination angle (°) | 45 | 45 | 45 | 45 | 45 | 45 | 45 | 45 | 45 | 45 | 45 | 45 |
| H/A | 0.03 | 0.05 | 0.40 | 0.45 | 0.16 | 0.16 | 0.16 | 0.16 | 0.10 | 0.16 | 0.16 | 0.16 |
| Sectional area SA/ sectional area SB | 1.00 | 1.00 | 1.00 | 1.00 | 1.00 | 1.00 | 0.90 | 0.90 | 1.00 | 0.34 | 0.34 | 1.00 |
| Number NB of projecting portions/ number NA of projecting portions | 0.00 | 0.00 | 0.00 | 0.00 | 0.00 | 0.00 | 0.00 | 0.00 | 0.00 | 0.00 | 0.00 | 0.75 |
| Ratio of specific cells (%) | 50 | 50 | 50 | 50 | 50 | 50 | 47 | 47 | 50 | 26 | 24 | 100 |
| Forming region of projecting portions | Central region | Central region | Central region | Central region | Central region | Central region | Central region and range excluding range of 5 mm from circumference | Central region and range excluding range of 3 mm from circumference | Central region | Central region | Central region | Whole region |
| Forming position of projecting portion | Side portion | Side portion | Side portion | Side portion | Side portion | Side portion | Side portion | Side portion | Corner portion | Side portion | Side portion | Side portion |
| Pressure loss (kPa) | 1.00 | 1.02 | 1.50 | 1.49 | 1.30 | 1.50 | 1.51 | 1.47 | 0.90 | 1.05 | 1.00 | 1.80 |
| Judgment of pressure loss | OK | OK | OK | OK | OK | OK | OK | OK | OK | OK | OK | OK |
| Bag emission (g/mile) | 0.019 | 0.018 | 0.013 | 0.013 | 0.012 | 0.010 | 0.013 | 0.015 | 0.019 | 0.018 | 0.021 | 0.015 |
| Judgment of bag emission | OK | OK | OK | OK | OK | OK | OK | OK | OK | OK | NG | OK |
| General judgment | OK | OK | OK | OK | OK | OK | OK | OK | OK | OK | NG | OK |

(Pressure Loss)

As to the prepared honeycomb structure, a pressure loss was measured by using a large wind tunnel tester. At this time, a gas temperature was set to 25° C. and a gas flow rate was set to 10 Nm³/min. Evaluation criteria were as follows. (1) When projecting portions were disposed only in a central portion of a honeycomb structure body (when each of Table 1 and Table 2 shows "the central region" in the column of "the forming region of the projecting portions"), the pressure loss of 1.50 kPa or less was evaluated as "OK" and the pressure loss in excess of 1.50 kPa was evaluated as "NG". This is because outputs deteriorate when the pressure loss is in excess of 1.50 kPa in the above case. (2) When the projecting portions were further disposed in a portion other than the central portion of the honeycomb structure body (i.e., when this case did not correspond to the case of the above (1)), the pressure loss of 1.80 kPa or less was evaluated as "OK", and the pressure loss in excess of 1.80 kPa was evaluated as "NG".

(LA-4 Test)

As to the prepared honeycomb structure, a test based on LA-4 mode of US federal test procedure was carried out as follows. Initially, a catalyst (a three-way catalyst) was loaded as much as 200 g/L onto the partition walls of the honeycomb structure. Then, an aging treatment of the honeycomb structure onto which the catalyst was loaded was carried out at 950° C. for 12 hours by use of an electric furnace. Next, the honeycomb structure onto which the catalyst was loaded was mounted at a position under a floor of a vehicle having a displacement of 2400 cc, to carry out a LA-4 test. In the LA-4 test, a direct modal mass of each exhaust gas component was measured by using an exhaust gas measuring device (model No. "MEXA-7400" manufactured by HORIBA, Ltd.). Furthermore, an amount of HC to be emitted as a typical exhaust gas component was measured. Additionally, a space velocity of the exhaust gas in this test was about 10000 (1/hour) (a high flow rate).

(Judgment of Bag Emission)

In a bag emission, when an amount of HC to be emitted was 0.019 g/mile or less, a judgment result was "OK", and when the amount was in excess of 0.019 g/mile, the judgment result was "NG". It is to be noted that when the result of the present evaluation is "OK", it is considered that the catalyst is uniformly coated and is therefore effectively utilized in purification of the exhaust gas, and hence, the purification performance improves.

(General Judgment)

General judgment was carried out in accordance with the following criteria on the basis of the evaluation of the pressure loss and the judgment of the LA-4 test. A case where both results of the evaluation of the pressure loss and the evaluation of the LA-4 test were "OK" was evaluated as "OK", and the other cases were evaluated as "NG".

Examples 2 to 19 and Comparative Examples 1 to 4

The procedure of Example 1 was repeated except that projecting portions were formed as shown in Table 1 and Table 2, to prepare honeycomb structures. Additionally, the honeycomb structures of Example 18 and Comparative Example 4 had a region C which did not correspond to any one of a region A and a region B. Table 2 shows a ratio (%) of a sectional area of the region C to a sectional area of a honeycomb structure body in a column of "an area of the region C".

Also as to the honeycomb structures of Examples 2 to 19 and Comparative Examples 1 to 4, the procedure of Example 1 was repeated to evaluate a pressure loss and carry out a LA-4 test. Table 1 and Table 2 show the results.

(Result)

As shown in Table 1 and Table 2, it is seen that in each of the honeycomb structures of Examples 1 to 19, a pressure loss is lower and a purification performance of an exhaust gas is higher than in the honeycomb structures of Comparative Examples 1 to 4.

A honeycomb structure of the present invention is utilizable as an exhaust gas purifying catalyst carrier to purify an exhaust gas.

DESCRIPTION OF REFERENCE NUMERALS

1: partition wall, 2: cell, 2a: specific cell, 10: honeycomb structure body, 11: first end face, 12: second end face, 20: circumferential wall, 21: projecting portion, 22: side surface of the projecting portion, 22a: one side surface of the projecting portion, 22b: the other side surface of the projecting portion, 30: catalyst, 100: honeycomb structure, F: bottom side, and H: height.

What is claimed is:

1. A honeycomb structure comprising:
a pillar-shaped honeycomb structure body having porous partition walls arranged to define a plurality of cells extending from a first end face to a second end face from through channels for a fluid, and a circumferential wall disposed to surround the partition walls,
wherein the partition walls have projecting portions projecting to extend into the plurality of cells and arranged continuously in an extending direction of the plurality of cells,
the honeycomb structure body has a region A and a region B in a cross section of the honeycomb structure body which is perpendicular to the extending direction of the plurality of cells,
the region A is a region including select cells of the plurality of cells in which the projecting portions projecting into the select cells are disposed and in which the number of projecting portions into the select cells is larger than an average number of the projecting portions to all of the remaining cells of the plurality of cells,
the region B is a region which surrounds the region A in the cross section,
a sectional area of the region A is defined as a sectional area SA, a sectional area of the region B is defined as a sectional area SB, and the sectional area SA and the sectional area SB satisfy a relation of Formula (1) mentioned below,
an average number of the projecting portions in a cell to be included in the region A is defined as a number NA of the projecting portions, an average number of the projecting portions in a cell to be included in the region B is defined as a number NB of the projecting portions, and the number NA of the projecting portions and the number NB of the projecting portions satisfy a relation of Formula (2) mentioned below, and
when a region C which does not correspond to any one of the region A and the region C is present, a ratio of a sectional area of the region C to a sectional area of the honeycomb structure body is 5% or less, $$\tfrac{1}{3} < \text{the sectional area } SA/\text{the sectional area } SB < 3 \quad \text{Formula (1):}$$

$$0 \leq \text{the number } NB \text{ of the projecting portions}/\text{the number } NA \text{ of the projecting portions} < 1, \text{ and} \quad \text{Formula (2):}$$

wherein the projecting portions project into 25% or more of the plurality of the cells,
a tip curvature radius R of an apex of each of the projecting portions is from 0.01 mm to 0.1 mm,
side surfaces of the projecting portions are inclined to the surfaces of the partition walls at an inclination angle of 40° to 70°, and
a hydraulic diameter A of all complete cells of the plurality of cells and a height H of the projecting portion satisfy a relation of $0.04 \leq H/A \leq 0.4$.

2. The honeycomb structure according to claim 1,
wherein in the partition walls arranged to define the plurality of cells, the number of the projecting portions to be disposed per side constituting a peripheral edge of each of the cells of the plurality of cells is 3 or less.

3. The honeycomb structure according to claim 1,
wherein the projecting portions are disposed in a central portion of the honeycomb structure body excluding a circumferential portion of a region of 5 mm from a circumference of the honeycomb structure body.

4. The honeycomb structure according to claim 1,
wherein the projecting portions are disposed in a whole region of the honeycomb structure body.

5. The honeycomb structure according to claim 1,
wherein the projecting portions are disposed in an intersecting region where the partition walls of two sides constituting a peripheral edge of a cell of the plurality of cells intersect.

* * * * *